Patented Aug. 2, 1949

2,477,560

UNITED STATES PATENT OFFICE 2,477,560

PREPARATION OF RIBITYLAMINOBENZENES

Leo Aaron Flexser, Elizabeth, and Walter A. Schnyder, Nutley, N. J., assignors to Hoffmann-La Roche Inc., Nutley, N. J., a corporation of New Jersey No Drawing. Application February 28, 1946, Serial No. 651,045

10 Claims. (Cl. 260—211)

1

Our invention relates to a novel method of producing ribitylaminobenzenes of the formula

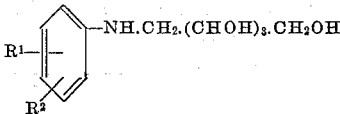

wherein $R^1$ and $R^2$ each stand for hydrogen or lower alkyl, $R^1$ and $R^2$ not necessarily being identical.

This class of compounds and methods of making them have come into existence only recently in connection with the development of vitamins, particularly with vitamin $B_2$, and they form valuable intermediates for the production of vitamins and drugs.

It is known that one compound of this class, D-ribitylxylidine of the formula

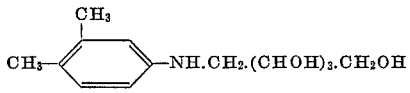

can be prepared by reduction of the known 3,4-dimethylaniline D-riboside (Karrer et al., Helvetica Chimica Acta 18, 1133, and Kuhn and Birkofer, Ber. 71, 621 (1938)), but the preparation of this intermediate on a technically feasible scale requires the preparation of a crystalline ribose or, at least, a highly purified ribose sirup. The manufacture of such a ribose is extremely difficult when one starts from the usual sources which contain only impure ribose, such as the liquors of the sodium amalgam reduction of ribonolactone, or liquors of hydrolysates of nucleic acids, nucleosides and nucleotides.

In U. S. Patent 2,384,105 to Lee, Solmssen, and Berger, a process is shown for the manufacture of ribitylaminobenzenes of the type manufactured by us, which process comprises hydrogenating ribosides in the presence of a metal hydrogenation catalyst and in the presence of a solvent.

We have discovered that it is unnecessary to prepare and isolate ribosides as preliminary steps in the manufacture of ribitylaminobenzenes. Our novel method comprises reacting ribose with an aminobenzene, in the presence of a solvent for the amine, and simultaneously stirring and hydrogenating the reaction mixture whereby ribitylaminobenzenes are formed directly. Various aminobenzenes, including substituted and unsubstituted compounds, may be employed, and, more particularly, the amines shown in U. S. Patent 2,384,102 to Lee, Solmssen, and Berger. The amine 3,4-xylidine is particu-

2 larly suitable for this reaction, since it prepares an intermediate useful in the manufacture of riboflavin.

The ribose which is employed may be either in a pure or in a crude condition. For example, we may utilize an aqueous solution of crude ribose, containing sodium sulfate, as obtained by the commercial reduction of ribonolactone with sodium amalgam while maintaining the pH at 3 to 4 with simultaneous addition of sulfuric acid.

Suitable solvents which may be employed are methanol and ethanol. However, other organic solvents for the organic amine may also be used.

In general, it is preferred to hydrogenate at high pressures, for example, 500 lbs. per square inch, since, at high pressures, there is less tendency to formation and separation of ribosides.

The temperature of hydrogenation may vary. However, increased temperatures are preferred for the purpose of maintaining the final product in solution until the completion of the hydrogenation.

The following example is illustrative of a method of carrying out our invention. However, we wish it to be understood that various aminobenzenes can be employed in this reaction, many examples of such amines being given in U. S. Patent 2,384,102. Variations and modifications of procedural nature are contemplated within the scope of our invention.

Example 85 liters of about a 10% aqueous solution of ribose are placed in a hydrogenation autoclave containing 80 liters methanol. A solution of 7.2 kg. of 3,4-xylidine in 20 liters methanol, and a suspension of 2.5 kg. Raney nickel in 3 liters methanol, are added. Hydrogen is immediately admitted into the autoclave to a pressure of 500 lbs. per square inch; and the mixture is vigorously agitated while being heated gently. Uptake of hydrogen begins at about 35° C. Heating is continued at the minimum temperature required for reasonably rapid hydrogen uptake, generally below 50° C. Finally the temperature is brought to 75° C. The hydrogenation takes about one hour. The hot solution is then filtered free from the catalyst, evaporated in vacuo to one-third the volume, and allowed to cool. A heavy crystallization of ribitylxylidine takes place. This product is centrifuged, washed with water, and dried.

We claim:

1. A process for the manufacture of ribitylaminobenzenes corresponding to the formula

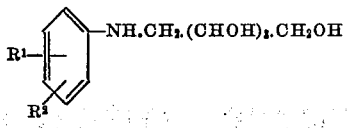

wherein $R^1$ and $R^2$ are radicals selected from the group consisting of hydrogen and lower alkyl, which comprises reacting ribose with a primary aromatic amine of the formula

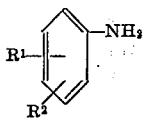

wherein $R^1$ and $R^2$ have the significance given above, in the presence of a solvent, while simultaneously hydrogenating the reaction mixture.

2. The method of claim 1 in which the amine is 3,4-xylidine.

3. The process of claim 1 in which the hydrogenation is carried out in the presence of a solvent for the amine.

4. The process of claim 1 in which the hydrogenation is carried out in the presence of a hydrogenation catalyst.

5. The process of claim 1 in which the hydrogenation is carried out in the presence of Raney nickel.

6. The process of claim 1 in which the amine is 3,4-xylidine, and in which the hydrogenation is carried out in the presence of Raney nickel and an organic solvent for the 3,4-xylidine.

7. The process of claim 1 in which the amine is 3,4-xylidine, and in which the hydrogenation is carried out in the presence of Raney nickel, and in the presence of methanol as a solvent.

8. The process of claim 1 in which the hydrogenation is carried out at about 500 lbs. per square inch pressure.

9. The process of claim 1 in which the ribose is employed in the form of an aqueous solution.

10. Process according to claim 1 in which the reaction is carried out at a low temperature.

LEO AARON FLEXSER.
WALTER A. SCHNYDER.

REFERENCES CITED

The following references are of record in the file of this patent:

UNITED STATES PATENTS

| Number | Name | Date |
|---|---|---|
| 2,016,962 | Flint et al. | Oct. 8, 1935 |
| 2,193,433 | Salzberg | Mar. 12, 1940 |
| 2,384,102 | Lee et al. | Sept. 4, 1945 |
| 2,384,105 | Lee et al. | Sept. 4, 1945 |